(12) United States Patent
Rukajärvi et al.

(10) Patent No.: US 6,738,471 B1
(45) Date of Patent: May 18, 2004

(54) METHOD AND SYSTEM FOR ENSURING A PSTN PROTOCOL RESTART PROCEDURE AS DEFINED BY THE V5 STANDARD

(75) Inventors: Arto Rukajärvi, Oulunsalo (FI); Toivo Lallukka, Oulu (FI); Timo Juntunen, Oulu (FI); Mika Haapea, Kiiminki (FI)

(73) Assignee: Nokia Corporation, Espoo (FI)

( * ) Notice: Subject to any disclaimer, the term of this patent is extended or adjusted under 35 U.S.C. 154(b) by 618 days.

(21) Appl. No.: 09/656,203

(22) Filed: Sep. 6, 2000

Related U.S. Application Data

(63) Continuation of application No. PCT/FI99/00191, filed on Mar. 12, 1999.

(30) Foreign Application Priority Data

Mar. 13, 1998 (FI) .................................................. 980568

(51) Int. Cl.[7] ................................................. H04M 7/00
(52) U.S. Cl. .................. 379/221.03; 379/219; 379/220; 379/229
(58) Field of Search ........................... 379/221.03, 219, 379/229, 220, 230, 198, 269, 272

(56) References Cited

U.S. PATENT DOCUMENTS 5,910,980 A * 6/1999 Ogasawara et al. ......... 379/142
6,278,700 B1 * 8/2001 Haster ........................ 370/329
6,289,093 B1 * 9/2001 Liinamaa et al. ............ 379/219

FOREIGN PATENT DOCUMENTS

| WO | WO 98/34418 | 8/1998 |
| WO | WO 98/38804 | 9/1998 |
| WO | WO 98/41037 | 9/1998 |
| WO | WO 98/42148 | 9/1998 |
| WO | WO 99/18739 | 4/1999 |

* cited by examiner

*Primary Examiner*—William J. Deane, Jr.
(74) *Attorney, Agent, or Firm*—Squire, Sanders & Dempsey L.L.P.

(57) ABSTRACT

The invention relates to a method and system for ensuring a PSTN protocol restart procedure as defined by the V5 standard after a failure of a first data link carrying PSTN protocol signalling messages. In the method, a first time-out (TC3) for starting the restart process is observed and, if the time-out has tripped, the restart procedure is started by sending a start message using a Control protocol signalling message consistent with the V5 standard. According to the invention, after the first data link carrying the PSTN protocol has been restored to working order, a check is carried out to establish whether a second data link intended to carry Control protocol signalling messages is in order, and this check is repeated until the second data link intended to carry Control protocol signalling messages is in order, and when the second data link is in order, a message for starting the PSTN protocol restart procedure is sent in the Control protocol.

9 Claims, 5 Drawing Sheets

Figure 1:
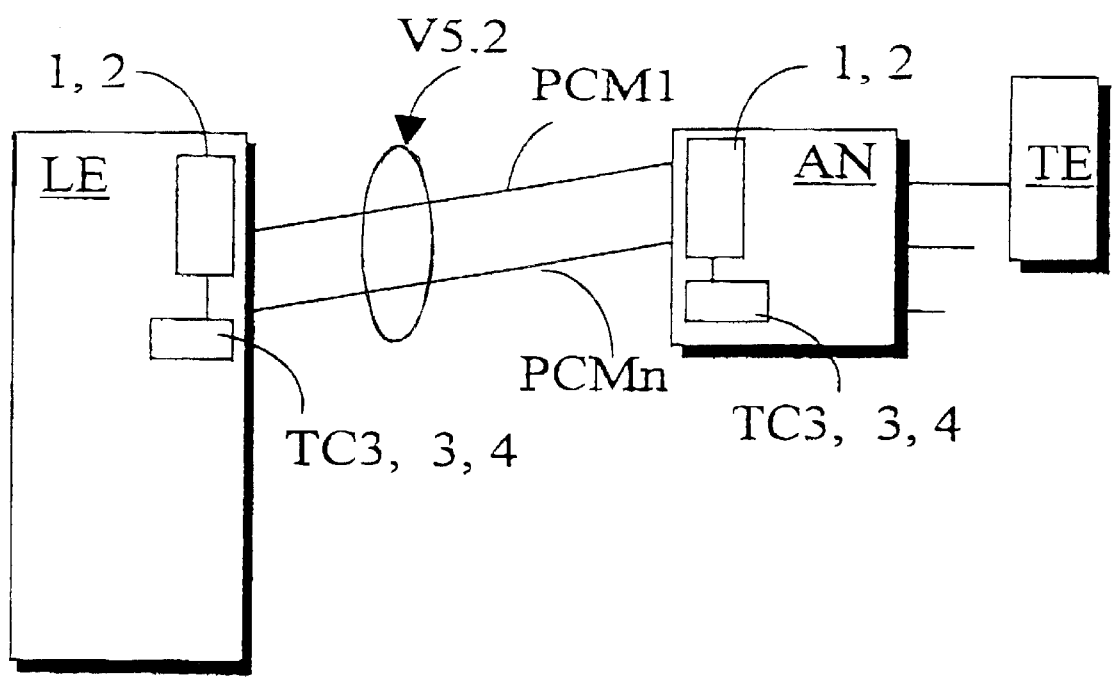
Figure 2A:
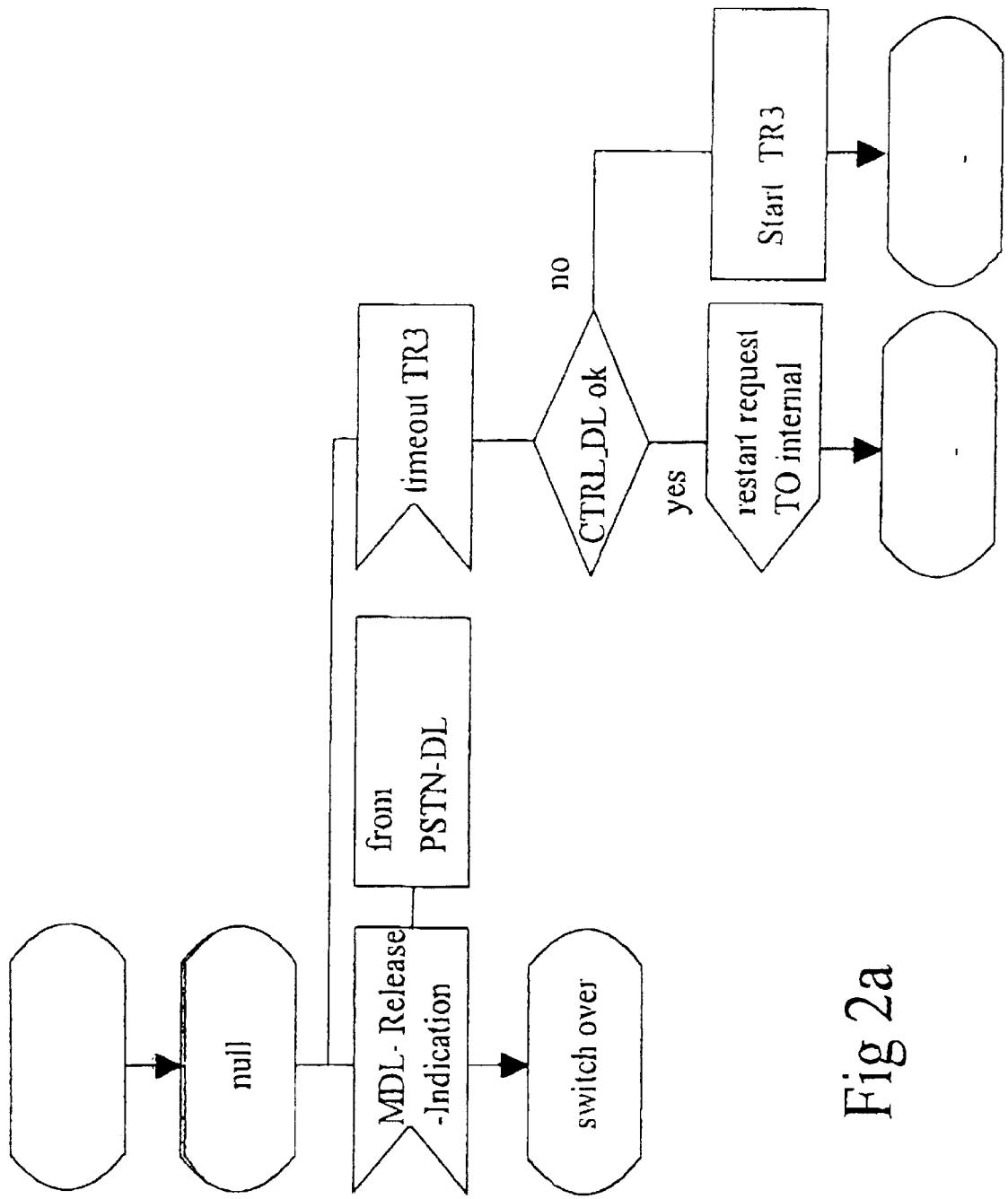
Figure 2B:
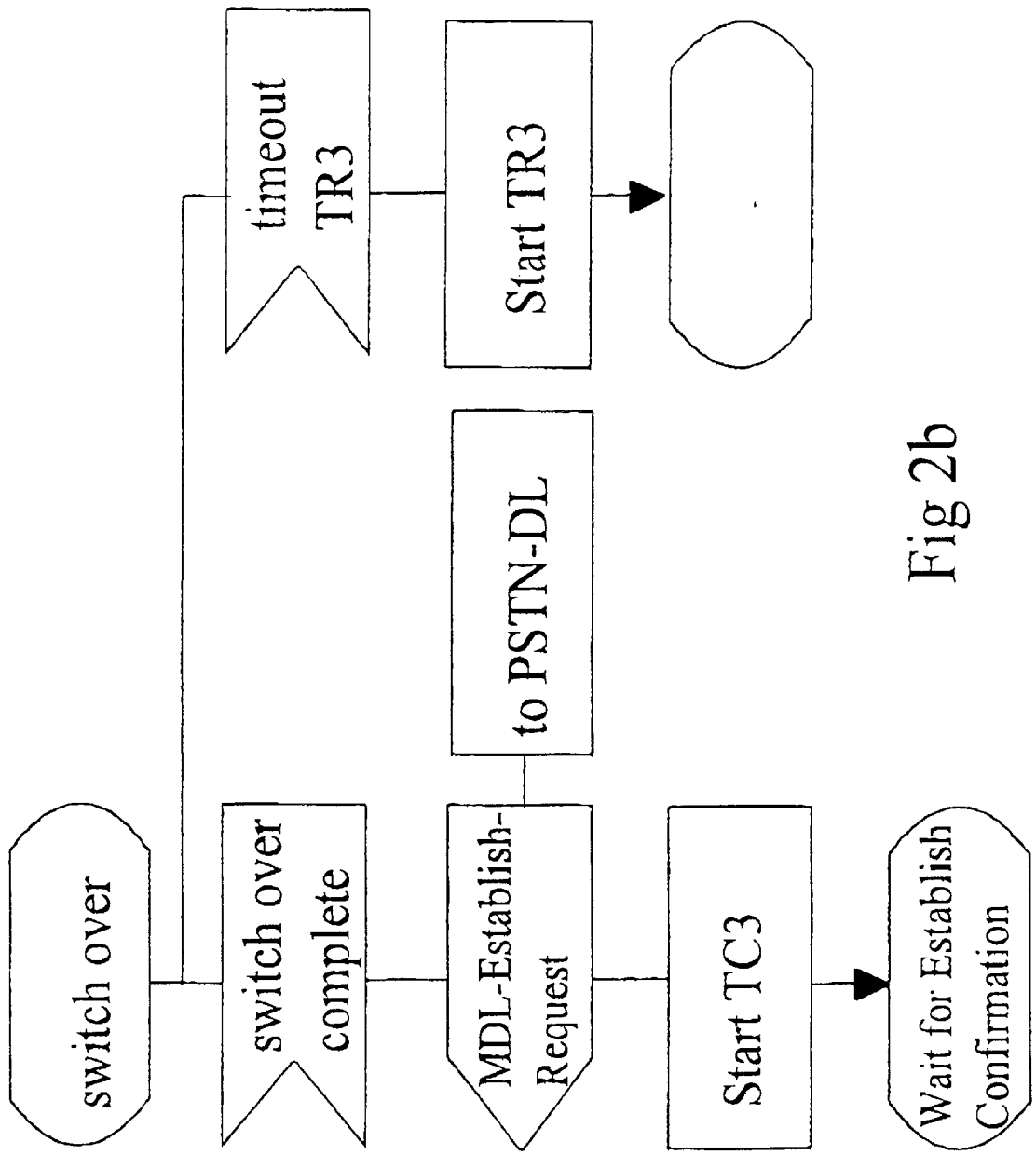
Figure 2C:
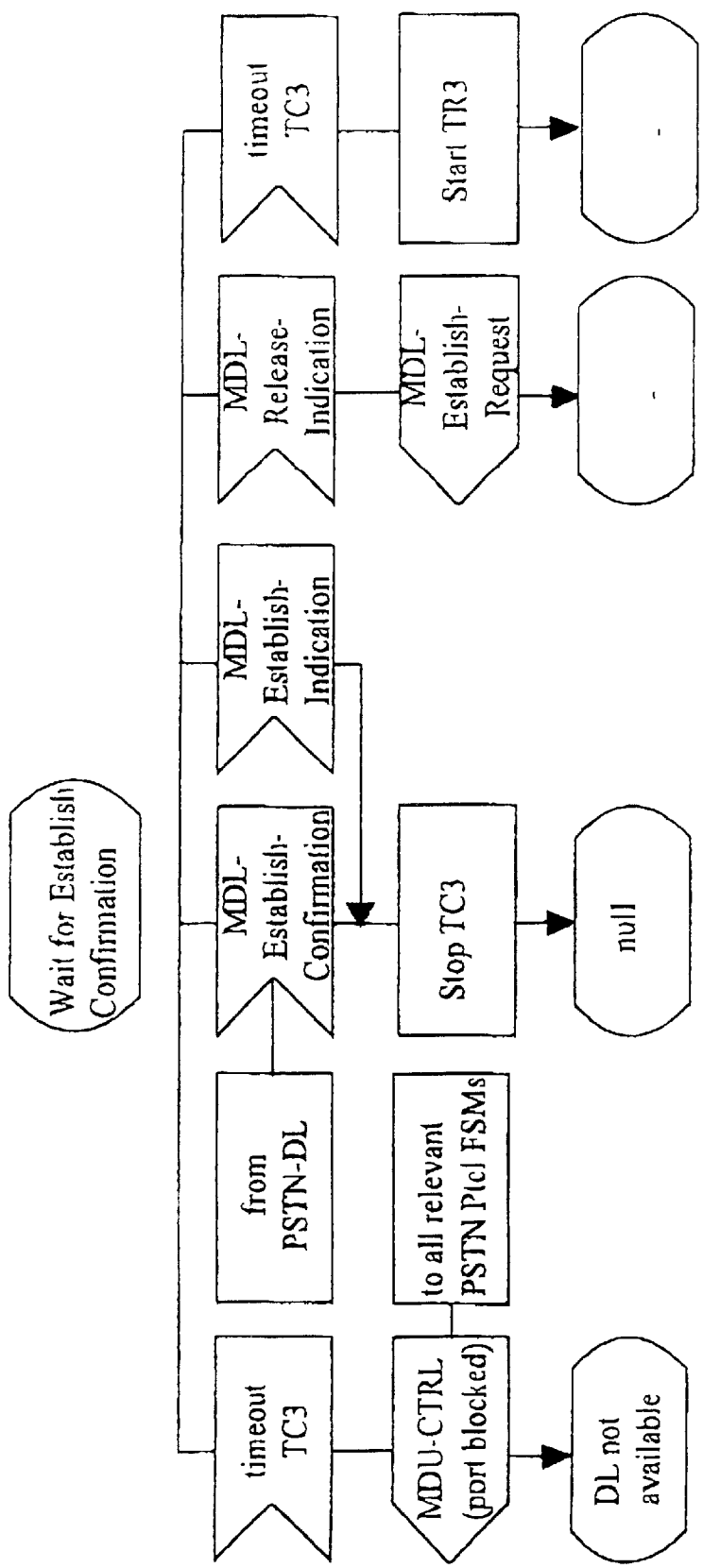
Figure 2D:
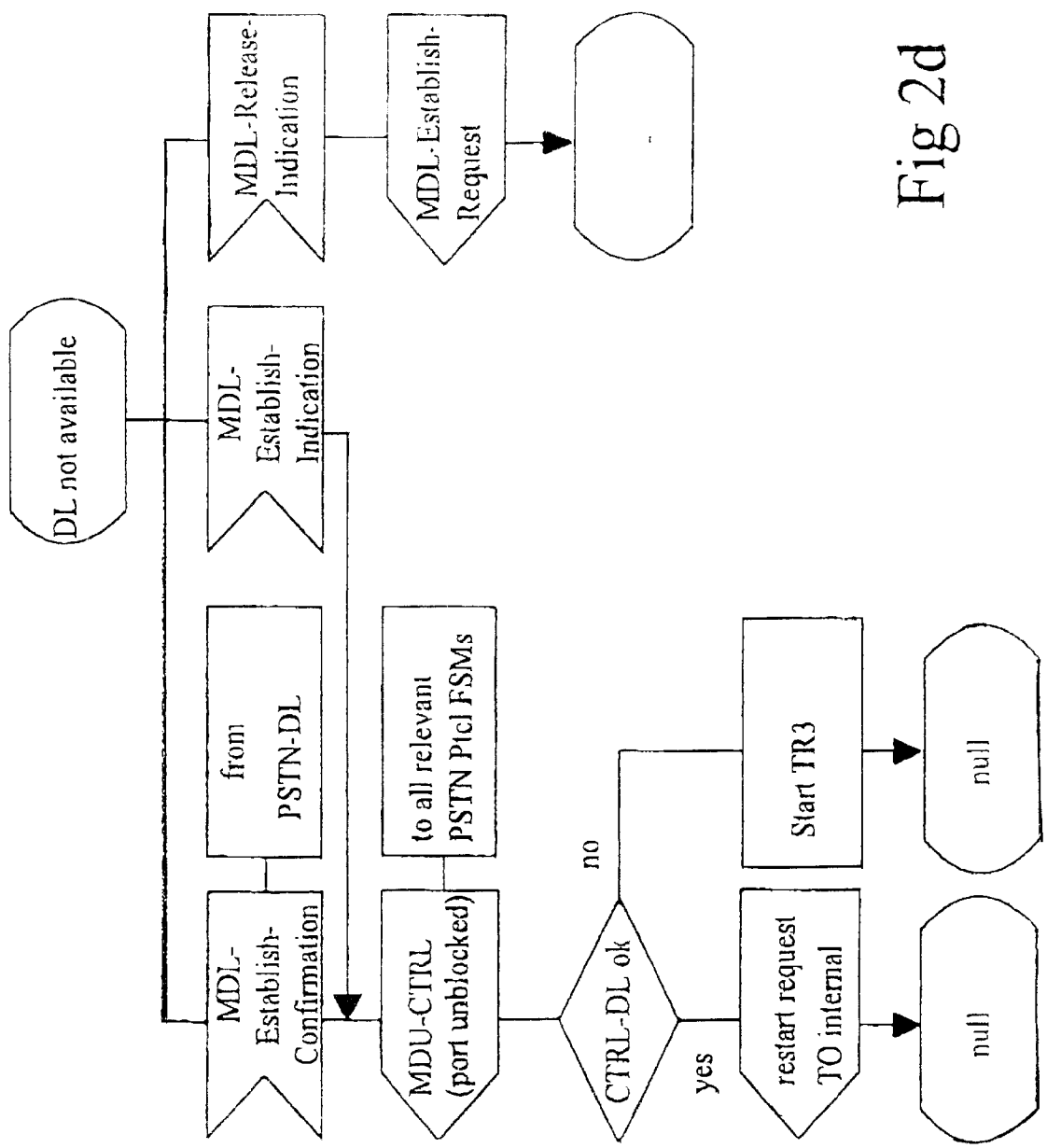

METHOD AND SYSTEM FOR ENSURING A PSTN PROTOCOL RESTART PROCEDURE AS DEFINED BY THE V5 STANDARD

This is a continuation of application Ser. No. PCT/FI99/ 0019, filed Mar. 12, 1999.

The present invention relates to a method as defined in the preamble of claim 1 and to a system as defined in the preamble of claim 6 for ensuring a PSTN protocol restart procedure as defined by the V5 standard after a failure of the data link carrying PSTN protocol signalling messages.

Open interfaces (V5.1 and V5.2) between an access network or an access node and a telephone exchange are defined in the ETSI (European Telecommunications and Standards Institute) standards of the ETS 300 324 and ETS 300 347 series. V5 interfaces enable subscribers belonging to a physically separate access network to be connected to a telephone exchange using a standard interface. A dynamic concentrator interface (V5.2) defined by the ETS 300 347 standard series consists of one or more (1–16) PCM (Pulse Code Modulation) lines. One PCM line comprises 32 channels, each of which with a transfer rate of 64 kbit/s, i.e. 2048 kbit/s altogether. The V5.2 interface supports analogue telephones as used in the public telephone network, digital, such as ISDN (Integrated Services Digital Network) basic rate and primary race interfaces as well as other analogue or digital terminal equipment based on semi-fixed connections.

A static multiplexer interface V5.1 consistent with the ETS 300 324-1 and 324-2 standards consists of one 2046 kbit/s PCM line. The V5.1 interface supports the same subscriber types except the ISDN primary rate interface.

In the V5 interface, certain time slots forming a so-called C-channel carry the protocols used co control the interface itself and the calls transmitted through it. The C-channel or the 64 kbit/s time slot used for this purpose is used to transmit information which may pertain to the Control protocol, the Link protocol, the Protection protocol or the BCC protocol or which may consist of PSTN signalling or ISDN data. Furthermore, according to the above-mentioned standards, the C-channel may be reserved for time slots 13, 15 and/or 31 of the link in the PCM line or V5 interface In the V5.2 interface in particular, the system automatically creates C-channels for the critical protocols (Control, Link control, BCC and Protection) The operator may place the PSTN signalling as desired either in the same channel with the critical protocols or in some other C-channel.

The operator can allocate a maximum of three signalling channels as so-called stand-by channels. These channels are used if the link to which the channels have originally been allocated fails. In a V5.2 interface comprising more than one 2-Mbit/s connections or links, the link whose physical C-channel in time slot 16 carries the Control, Link control. BCC and Protection protocols is designated as a primary link. Further, the link whose physical C-channel in time slot 16 only carries the Protection protocol is a secondary link. The main features of the use and allocation of the above-mentioned channels are described in the standards referred to.

Although, as described above, many kinds of checking procedures are implemented in the V5 interface and many other expedients are used to ensure correct operation of the interface, the standard still contains drawbacks. The ETS 300 324-1 standard, Edition 2 (Annex C, section 17), specifies that in the event of a failure in the PSTN protocol signalling channel (PSTN DL), a time-out TC3 is started and after the time-out period, all PSTN call's going on are disconnected The same section further specifies that the PSTN protocol restart procedure has to be executed after the signalling channel has been restored co working order if the time-out TC3 has expired. However there is no check to determine whether the Control protocol signalling channel (CONTROL DL) is in operation, which means that if the PSTN protocol restart procedure is to be executed and the Control protocol signalling channel is not in working order, the restart procedure will fail to be executed. As a result, there may be connections left hanging, at the PSTN subscriber ports without the local exchange or access node knowing anything about them. This results in problems regarding billing and corresponding operations.

In an example, a method is described which comprises a verification of whether the data link which is to carry the Control protocol is in working order or not. However, if the data link is out of order, the restart procedure can not be executed. This may result in unnecessary blocking of PSTN subscriber ports because the blackout of the Control protocol data link may also be of a short duration.

The object of the present invention is co eliminate or at least to significantly reduce the problems described above. A specific object of the present invention is to ensure the execution of the PSTN protocol restart process as far as possible. Another object of the invention is to disclose a flexible method and system for ensuring proper functioning of PSTN subscriber ports.

As for the features characteristic of the invention, reference is made to the claims.

In the method of the invention for ensuring the PSTN protocol start procedure according to the V5 standard, after a first data link carrying PSTN protocol signalling messages has failed, a first time-out for starting the restart process is observed. The time-out TC3, is defined in section 17 of annex C to standard ETS 300 324-1. The standard defines the duration of the time-out as 15 seconds. After the 15-second time-out period has elapsed, the PSTN restart procedure is started by sending a start message using a Control protocol signalling message consistent with the V5 standard.

According to the invention, after the first data link carrying the PSTN protocol has been restored to working order after a failure, a check is carried out to establish whether a second data link intended to carry Control protocol signalling messages is in order, and this check is repeated until the data link in question is in order. In addition, when the second data link is in order, a check is carried out to establish whether the first time-out for the PSTN protocol has expired. When both conditions are fulfilled, the PSTN protocol restart procedure is executed.

As compared with prior art, the invention provides the advantage that it makes it possible to avoid blocking of PSTN subscriber ports due to short-duration malfunctions in the data link carrying the Control protocol, which is a consequence of a failure detected in the Control protocol data link because the PSTN protocol restart procedure cannot be executed. Thus, the invention clearly improves the reliability of the V5 interface.

In a preferred embodiment of the present invention, the interval of checking the working order of the second data link intended to carry Control protocol signalling messages is monitored using a second time-out, TR3, which is started after the check and replaced until the second data link is in order. The duration of the first time-out, TC3, is preferably shorter than the duration of the second time-out. TR3.

Thus, because of the above-mentioned time-outs the duration of the shorter time-out is spent waiting and observing whether the first data link intended to carry the PSTN protocol recovers from its malfunction. After this, the second time-out is started, which preferably is longer than the first time-out, and after the second time-out has expired, a check is carried out to establish whether the first and second data links intended to carry the PSTN and Control protocols are in working order. In this way, small breaks in the operation of the first data link are eliminated by means of the first time-out and then if even the second data link is out or order, both data links are given a chance to recover from the malfunction during the second time-out.

Since the V5 interface is controlled by both the local exchange and the access node, situations may occur where one of the parties finds that all data links are in order and starts the PSTN protocol restart procedure while the other party is carrying out checks on the data links as described above. In this case, the second time-out is stopped and reset.

The system of the invention for ensuring a PSTN protocol restart procedure as defined by the V5 standard comprises means for providing a first time-out. In the system, the restart procedure is started by sending a start message using a Control protocol signalling message consistent with the V5 standard if the first time-out for the starting of the restart procedure has expired.

According to the invention, the system comprises means for checking the condition of a second data link intended for the transmission of Control protocol signalling messages after a first data link carrying the PSTN protocol has been restored to working order. Moreover, the system comprises means for restarting the checking procedure until the second data link intended to carry the Control protocol signalling messages is in order. As for the advantages of the system of the present invention reference si made to the advantages provided by the method described above.

In an embodiment of the invention, the system comprises means for checking the start of the first time-out before the PSTN protocol restart procedure is started. In practice, this means ensuring that the first time-out, which preferably has a duration of 15 seconds, has expired.

In a further embodiment, the system comprises means or implementing a second time-out, said second time-out being started if the second data link intended to carry Control protocol signalling messages is out of order. In practice, this is a timer implemented in the access rode e.g. as a suitable program block which measures a predetermined length of time for the checking intervals. The time-out is repeated until the second data link is in order.

In a preferred case, the first time-out has a shorter duration than the second time-out. The system may additionally comprise means implemented at both ends of the V5 interface for monitoring the other party to detect if it starts the PSTN protocol restart procedure. If it is detected that the procedure is started, then the second time-out is stopped and reset.

In the following, the invention will be described by the aid of a few examples of its embodiments by referring to the attached drawing, wherein FIG. 1 presents a preferred system according to the invention; and FIGS. 2a–2d present: flow diagrams representing the implementation or a preferred embodiment of the present invention.

The telecommunication system presented in FIG. 1 comprises a local exchange LE and an access node AN. The local exchange LE and the access node AN communicate via a V5 interface V5 which may be a V5.1 or a V5.2 interface. In addition, connected to the access node is e.g. a subscriber terminal TE, which may be e.g. a telephone. In FIG. 1, the access network consists or the access node AN and the terminal equipment TE connected to it as well as the lines between them. The function of the access node AN is to transmit the signalling between the local exchange LE and the terminal equipment TE in a transparent manner. Depending on the V5 interface used, static or dynamic allocation of V5 interface capacity to subscribers may be used. The V5.2 interface uses dynamic allocation.

The V5 interface presented in FIG. 1 is a V5.2 interface. The interface comprises a number of PCM lines, implementing data links PCM1–PCMn. The configuration of the V5 interface may be e.g. such that the PSTN protocol signalling messages a transmitted over link PCM1 and the Control protocol signalling messages are transmitted over link PCM16 (not shown in the figure). PCM1 may fail, interrupting the action of the PSTN protocol. In addition, PCM16 may fail as well, in which case the Control protocol is switched over to a new link, e.g. link PCM15 (not shown in the figure)

The local exchange LE and the access node AN presented in FIG. 1 comprise means 1 for checking, after the first data link PCM1 carrying the PSTN protocol has been restored to working order, the condition of the second data link PCM16 intended to carry the Control protocol signalling messages. Both network elements also comprise means 2 for starting the checking procedure again until the second data link PCM16 for carrying the Control protocol is in order. Both network elements are also provided with means 3 for verifying the state of the first time-out (TC3) prior to starting the PSTN protocol restart procedure. Like-wise, the network elements comprise means 4 for providing a second time-out (TR3). In a preferred case, the second time-out (TR3) is started if the second data link PCM16 intended to carry the Control protocol signalling messages is out of order.

The ways in which of the above-mentioned means 1, 2, 3, 4 can be implemented in the aforesaid network elements e.g. using suitable program blocks are obvious to the skilled person. Therefore, their implementation will not be described in detail in this context.

In the following, a preferred embodiment of the present invention will be described by referring to FIGS. 2a–2d. When the PSTN data link fails, an MDL-Release-Indication message is received. After this, an attempt is made to switch the data link over to another channel. After a 'Switch over complete' message (FIG. 1b), the program block controlling the PSTN data link is given a request to set up a PSTN channel (MDL-Establish-Request), whereupon the first time-out TC3 is started. A message concerning establishment of the data link (Establish Confirmation) is now expected.

If the first time-out TC3 expires and no data link has been established, a Port Blocked message is sent to the subscriber port control system of the access node AN, which means that the subscriber ports are out of use. The system is now in a condition where the PSTN data link not available (DL not available). If a message confirming establishment of the data link is received before the first time-out TC3 expires (MDL Establish-Confirmation, MDL-Establish-Indication), operation in the V5 interface is continued without executing the restart procedure.

In the 'DL not available' situation (FIG. 1d) a message indicating restoration of the first data link may be received. After that, a message (port unblocked) that unblocks the subscriber ports is sent to all the PSTN subscriber ports. Next, a check is carried out to establish whether the second data link carrying the Control protocol is in order (CTRL- DL ok). If the second data link is in order, then the second message or the restart procedure is sent, if the second data link is not in order, the second time-out TR3 is started.

To summarise the above examples, the basic idea of the invention is repeated: When the first data link carrying the PSTN protocol has recovered from a failure, a check is carried out to determine whether the second data link carrying the Control protocol is in working order and whether the first time-out TC3 has expired. If both of the above conditions are true, then the PSTN protocol restart procedure is started. If the second data link carrying the Control protocol is out of order and the first time-out TR3 has expired, then the second time-out TR3, whose duration is longer than that of the first time-out, is started. Expiration of the first time-out is required because short interruptions in the operation of the first data link do not require execution of the restart procedure. After the second time-out TR3 has expired, a check is carried out to establish whether the data links carrying the PSTN protocol and the Control protocol are in working order If both are ok, then the PSTN protocol restart procedure is started. If either one of the data links is defective, then the second time-out TR3 is restarted. This checking and time-out process is continued until the restart Procedure has been executed.

The invention is not restricted to the examples or its embodiments described above, but many variations are possible within the scope of the inventive idea defined by the claims.

What is claimed is:

1. Method for ensuring a PSTN protocol restart procedure as defined by a V5 standard after a failure of a first data link carrying PSTN protocol signalling messages, the method comprising:

observing a first time-out for starting a restart procedure;

if the first time-out has tripped, starting the restart procedure by sending a start message using a Control protocol signalling message consistent with a V5 standard;

after a first data link carrying a PSTN protocol has been restored to working order, performing a check to establish whether a second data link intended to carry the Control protocol signalling messages is in order;

repeating the check until the second data link intended to carry the Control protocol signalling messages is in order; and sending, when the second data link is in order, a message for starting the PSTN protocol restart procedure in the Control protocol.

2. Method as defined in claim 1, wherein before starting the PSTN protocol restart procedure, a check is carried out to ensure the first time-out for starting the restart procedure has tripped.

3. Method as defined in claim 1, wherein if the second data link is not in order, a second time-out is started, and after the second time-out has tripped, the check is again carried out to establish whether the second data link intended to carry Control protocol signalling messages is in order.

4. Method as defined in claim 3, wherein if a local exchange or an access node starts the restart procedure, then the second time-out in the access node or the local exchange, respectively, is terminated.

5. Method as defined in claim 1, wherein a duration of the first time-out is shorter than a duration of a second time-out.

6. System for ensuring a PSTN protocol restart procedure as defined by a V5 standard after a failure of a first data link carrying PSTN protocol signalling messages, said system comprising:

providing means for providing a first time-out, a restart procedure being started in a system by sending a start message using a Control protocol signalling message consistent with a V5 standard if the first time-out for starting the restart procedure has tripped;

first checking means for checking a condition of a second data link intended to carry Control protocol signalling messages after a first data link carrying a PSTN protocol has been restored to working order; and starting means for starting a check again until the second data link intended to carry Control protocol signalling messages is in order.

7. System as defined in claim 6, further comprising:

second checking means for checking a state of the first time-out before a PSTN protocol restart procedure is started.

8. System as defined in claim 6, further comprising:

implementing means for implementing a second time-out, said second time-out being started if the second data link intended to carry Control protocol signalling messages is not in order.

9. System as defined in claim 6, wherein a duration of the first time-out is shorter than a duration of the second time-out.

* * * * *